(12) United States Patent
Jones et al.

(10) Patent No.: US 10,882,616 B2
(45) Date of Patent: Jan. 5, 2021

(54) SAFETY LINK ASSEMBLY FOR AN AERIAL DELIVERY APPARATUS

(71) Applicant: IRVINGQ LIMITED, Mid Glamorgan (GB)

(72) Inventors: Martyn Philip Jones, Mid Glamorgan (GB); Richard Anthony Laws, Mid Glamorgan (GB); Barbara Anne Diane Duclos, Cardiff (GB)

(73) Assignee: Airborne Systems Limited, Mid Glamorgan (GB)

( * ) Notice: Subject to any disclaimer, the term of this patent is extended or adjusted under 35 U.S.C. 154(b) by 667 days.

(21) Appl. No.: 15/695,964

(22) Filed: Sep. 5, 2017

(65) Prior Publication Data

US 2018/0065746 A1 Mar. 8, 2018

(30) Foreign Application Priority Data

Sep. 8, 2016 (GB) .................................... 1615246.4

(51) Int. Cl.
*B64D 1/12* (2006.01)
*B64D 17/38* (2006.01)
*F16B 2/18* (2006.01)

(52) U.S. Cl.
CPC .............. *B64D 1/12* (2013.01); *B64D 17/38* (2013.01); *F16B 2/185* (2013.01); *Y10T 403/595* (2015.01)

(58) Field of Classification Search
CPC ........ B64D 1/12; B64D 17/38; B64D 17/383; F16B 2/185; Y10T 24/45644; Y10T 403/595; Y10T 403/599; Y10T 403/602; Y10T 403/608

USPC ........... 403/322.4, 325, 327, 330; 294/82.25, 294/82.33; 244/137.3; 24/637

See application file for complete search history.

(56) References Cited

U.S. PATENT DOCUMENTS

| | | | | |
|---|---|---|---|---|
| 2,852,217 A | * | 9/1958 | Engelhardt | B64D 17/383 244/151 B |
| 3,425,739 A | * | 2/1969 | Criley | B64D 17/383 244/137.3 |
| 4,201,410 A | * | 5/1980 | Crawford | B63B 21/60 294/82.33 |

(Continued)

FOREIGN PATENT DOCUMENTS

DE 3236584 C2 2/1986

OTHER PUBLICATIONS

Christof Sodtke, "Extended European Search Report", dated Dec. 21, 2017, EP Patent Application No. 17189781.2.

*Primary Examiner* — Josh Skroupa
(74) *Attorney, Agent, or Firm* — LeonardPatel PC; Sheetal S. Patel

(57) ABSTRACT

A safety link assembly for use with an aerial delivery apparatus, the assembly comprising a main body, an ejectable connector, a retaining mechanism comprising a retaining lever rotatably mounted on a rotary axis on the main body and rotatable between a first retaining position, and a second releasing position, and a securing mechanism comprising a securing member moveable between a first securing position, and a second non-securing position, wherein the distance from the first region of the retaining lever to the rotary axis is less than the distance from the second region of the retaining lever to the rotary axis. Methods of performing an aerial delivery from an aircraft are also included.

20 Claims, 7 Drawing Sheets

(56) References Cited

U.S. PATENT DOCUMENTS

| | | | |
|---|---|---|---|
| 4,428,551 A | 1/1984 | Woram et al. | |
| 4,678,219 A * | 7/1987 | Smith | B66C 1/34 |
| | | | 294/82.33 |
| 4,754,686 A * | 7/1988 | Guitaut | B64D 1/06 |
| | | | 294/82.33 |
| 6,796,531 B1 * | 9/2004 | Anderson | B64D 17/383 |
| | | | 244/151 B |
| 8,016,333 B2 * | 9/2011 | Brunner | B66C 1/34 |
| | | | 294/82.2 |
| 2011/0318097 A1 | 12/2011 | Parkinson | |
| 2012/0280085 A1 | 11/2012 | Sinclair et al. | |
| 2013/0255365 A1 | 10/2013 | Zipay et al. | |

* cited by examiner

SAFETY LINK ASSEMBLY FOR AN AERIAL DELIVERY APPARATUS

CROSS-REFERENCE TO RELATED APPLICATION

This application claims the benefit of United Kingdom Patent Application No. 1615246.4, filed on Sep. 8, 2016. The subject matter thereof is hereby incorporated herein by reference in its entirety.

FIELD

The present invention relates to aerial delivery systems and methods, and more particularly, a safety link assembly for an aerial delivery apparatus. Some embodiments pertain to a safety link assembly for releasing a connection between an aerial delivery platform and an extractor parachute, and methods of performing an aerial delivery from an aircraft.

BACKGROUND

Conventionally, such safety link assemblies (or extraction systems) comprise a coupling (often called an extraction force transfer coupling—EFTC). The coupling comprises a rear facing connection fixed to an aerial delivery platform and a releasable jaw mechanism. When closed, the jaw mechanism retains a connection to an extractor parachute, which may include an extraction parachute jettison device (EPJD), connected to the extractor parachute. When performing an air drop of the aerial delivery platform from an aircraft, the extractor parachute is released out the back of the aircraft and the drag on it causes the parachute to pull the platform out of the aircraft. This is done through an extraction line from the extractor parachute either through the optional EPJD or directly to the jaw mechanism in the EFTC and the connection of the EFTC to the platform. When the platform has moved a required distance (normally when it has reached the aft end of a ramp at the back of the aircraft), the EFTC jaw mechanism is released. This releases the extractor parachute from the platform and transfers the extraction force to deploy the main parachutes.

Unfortunately, on occasion, the EFTC can open prematurely. This causes the extractor parachute to be released and deploy the main parachutes while the platform is still within the aircraft. This malfunction may lead to a "main canopy extraction" at a higher speed, and perhaps with a rotation component, with an associated risk of damage to the aircraft.

It has been suggested to use two such EFT Couplings in parallel to retain the connection of the platform and extractor parachute, in case one of them should open prematurely.

However, each coupling is heavy in order to provide a jaw mechanism able to withstand a large force (from the tension from the extractor parachute). In addition, such a coupling may not allow prompt releasing of the connection.

The present invention seeks to mitigate the above-mentioned problems. Alternatively or additionally, the present invention seeks to provide an improved safety link assembly and/or method of performing an aerial delivery from an aircraft.

SUMMARY

The present invention provides, according to a first aspect, a safety link assembly for use with an aerial delivery apparatus, the assembly comprising a main body, an ejectable connector, a retaining mechanism comprising a retaining lever rotatably mounted on a rotary axis on the main body and rotatable between a first retaining position, in which a first region of the retaining lever acts on the ejectable connector to retain the ejectable connector adjacent the main body, and a second releasing position, in which the ejectable connector is ejectable from the main body, and a securing mechanism comprising a securing member moveable between a first securing position, in which a first region of the securing member acts on a second region of the retaining lever to secure the retaining lever in its first retaining position, and a second non-securing position, in which the retaining lever is not secured in the first retaining position, wherein the distance from the first region of the retaining lever to the rotary axis is less than the distance from the second region of the retaining lever to the rotary axis.

Having the distance from the first region of the retaining lever to the rotary axis being less than the distance from the second region of the retaining lever to the rotary axis provides a mechanical advantage. This means that the force needed to be exerted by the securing mechanism on the retaining lever is less than the force required by the retaining lever on the ejectable connector.

The safety link assembly may be used in a parallel arrangement with a conventional EFTC coupling. In such an arrangement, the extractor parachute is connected to the platform by two "parallel" paths; one via the EFTC and one via the safety link assembly. In particular, the extractor parachute may be connected to the ejectable connector. Hence, if the EFTC opens too early, the connection of the platform with the extractor parachute is retained by the safety link assembly until a desired time. This enables the aerial delivery sequence to occur successfully.

Alternatively, the safety link assembly may be used instead of a conventional EFTC coupling. As a further alternative, two such safety link assemblies could be used in a parallel arrangement with each other or packaged within the same main housing.

Preferably, the first region and second region of the retaining lever are both on the same side of the retaining lever with respect to the rotary axis. This makes the arrangement more compact.

Preferably, the securing member comprises a securing lever rotatably mounted on a rotary axis on the main body and rotatable between the first securing position and second non-securing position.

More preferably, the securing mechanism further comprises a locking member, moveable between a first locking position, in which the locking member acts on a second region of the securing lever to lock the securing lever in its first securing position, and a second non-locking position, in which the securing lever is not locked in the first securing position.

Even more preferably, the distance from the first region of the securing lever to the rotary axis of the securing lever is less than the distance from the second region of the securing lever to the rotary axis. This provides a second mechanical advantage. This means that the force needed to be exerted by the locking member on the securing lever is less than the force required by the securing lever on the retaining lever.

Preferably, the first region and second region of the securing lever are on opposite sides of the securing lever with respect to the rotary axis. Hence, when the securing lever rotates, the second region can rotate round to then act on the retaining lever to urge it away from its retaining position.

Preferably, the locking member is biased towards its second non-locking position by a biasing member, such as a spring.

Preferably, the locking member comprises a cam follower surface and wherein the assembly further comprises a cam with a corresponding cam surface (for abutting against the cam follower surface).

More preferably, the cam is associated with a drop arm such that when the drop arm moves, the cam also moves and enables movement of the locking member. The drop arm may be caused to rotate when the platform has reached a required position, with respect to the aircraft.

Even more preferably, when the drop arm moves it causes the cam to rotate.

Even more preferably, the cam surface is at least partially shaped as a spiral so that as the cam rotates in an unlocking direction, the cam surface upon which the cam follower surface of the locking member abuts moves in a direction away from the locking member, allowing the locking member to move from its first locking position to its second un-locking position. The whole of the cam surface may form part of a spiral or only a portion of the cam surface may form part of a spiral.

Preferably, the cam follower surface is a convex rounded shape. This reduces the risk of jamming of the cam follower and cam surface for a number of different relative angles of the cam and cam follower surfaces.

Preferably, the retaining lever is rotatable from its first retaining position, past its second releasing position to a third fully released position, in which the retaining lever is out of an ejection path of the ejectable connector.

Preferably, the main body comprises a biasing member, such as a spring, to bias the retaining lever away from its first retaining position. Hence, when the retaining lever has been moved from its first retaining position to its second releasing position, it is prevented from moving back to the first retaining position by the biasing force from the biasing member.

More preferably, the biasing member is positioned adjacent the ejectable connector in use such that the ejectable connector is biased away from the body and biases the retaining lever away from the first retaining position.

Preferably, the main body also comprises a retaining lip to help retain the ejectable connector adjacent to the main body.

More preferably, the retaining lip is curved in shape. Even more preferably, the ejectable connector comprises a shaped portion that corresponds to the shape of the overhang lip portion. These reduce the risk of jamming of the ejectable connector in the main body.

According to a second aspect of the invention there is also provided a method of performing an aerial delivery from an aircraft, wherein the method uses a safety link assembly, as described above, so as to ensure an extractor parachute is only separated from an aerial delivery platform once the platform has been pulled out relative to the aircraft by a required distance.

According to a third aspect, there is also provided a safety link assembly for connecting an aerial delivery platform to an extractor parachute, the safety link assembly including a main body and an ejectable connector for being retained adjacent the main body, the ejectable connector being attachable to the extractor parachute and ejectable from the main body.

According to a fourth aspect of the invention there is also provided a method of performing an aerial delivery from an aircraft, wherein the method includes the steps of connecting an aerial delivery platform to an extractor parachute via a safety link assembly, the safety link assembly including a main body and an ejectable connector retained adjacent the main body, the ejectable connector being attached to the extractor parachute, allowing the extractor parachute to pull out the platform relative to the aircraft, and releasing the ejectable connector from the main body, thus releasing the extractor parachute from the platform.

Preferably, in the third and fourth aspects, the safety link assembly comprises a retaining lever rotatably mounted on a rotary axis on the main body and rotatable between a first retaining position, in which a first region of the retaining lever acts on the ejectable connector to retain the ejectable connector adjacent the main body, and a second releasing position, in which the ejectable connector is ejectable from the main body, and a securing mechanism comprising a securing member moveable between a first securing position, in which a first region of the securing member acts on a second region of the retaining lever to secure the retaining lever in its first retaining position, and a second non-securing position, in which the retaining lever is not secured in the first retaining position, wherein the distance from the first region of the retaining lever to the rotary axis is less than the distance from the second region of the retaining lever to the rotary axis.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described, by way of example only, with reference to the accompanying drawings of which.

DETAILED DESCRIPTION OF THE EMBODIMENTS

Figure 1A:
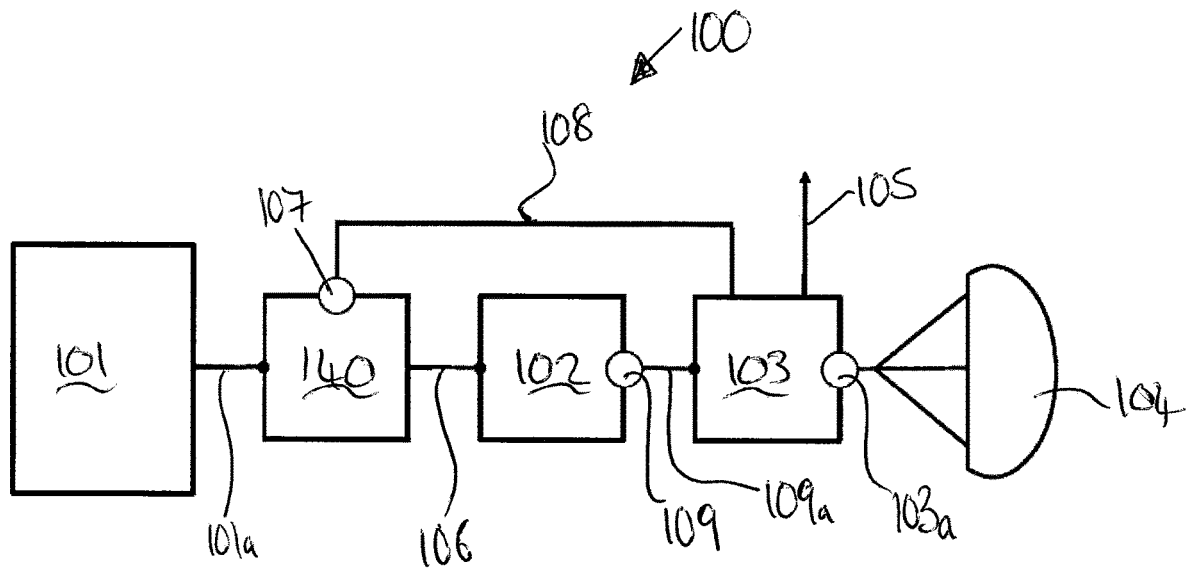
FIG. 1a shows a schematic view of an aerial delivery system according to a first embodiment of the invention, during normal operation.

FIG. 1a shows a schematic view of an aerial delivery system 100 according to a first embodiment of the invention, during normal operation. The system 100 comprises a conventional aerial delivery platform 101. This platform 101 is connected by pivotal connection 101*a* to a safety link assembly 140, which will be described in more detail later. The safety link assembly 140 has two other connections.

The first connection is a releasable connection 107, which will be described in more detail later, to a strop line 108. This strop line 108 is connected to a conventional EPJD 103.

The second connection is a fixed connection to a conventional EFT coupling 102. The EFT coupling 102 has a jaw mechanism making a releasable jaw connection 109. This jaw connection 109 is connected by line 109*a* to the EPJD 103.

Hence, there are two connection paths from the safety link assembly 140 to the EPJD 103 in a parallel arrangement to each other.

The EPJD 103 is connected to a main parachute riser 105 in the conventional manner. The EPJD 103 is also connected to an extractor parachute 104 by convention jettison connector 103*a*.

Figure 1B:
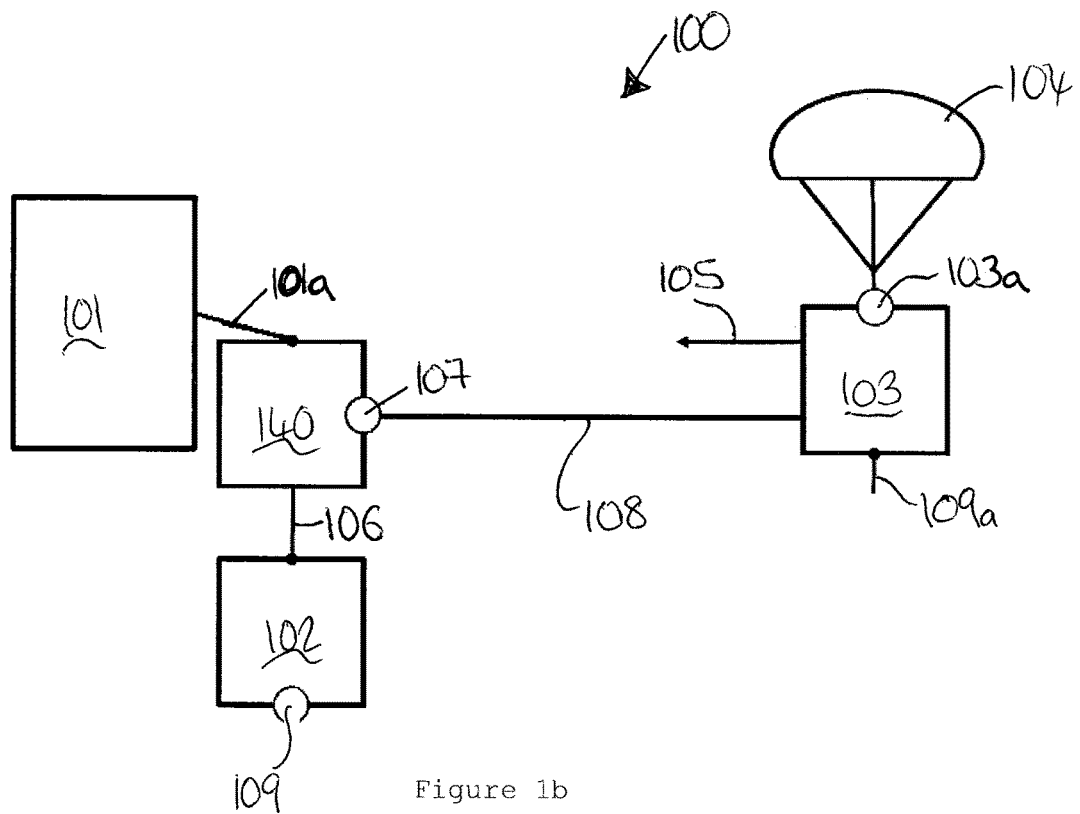
FIG. 1b shows a schematic view of the aerial delivery system of FIG. 1a, during failsafe operation.

FIGS. 2*a* to 2*d* show part of the aerial delivery system 100 of FIGS. 1*a* and 1*b* in various different stages of normal operation. In these figures, the safety link assembly 140 can be seen in more detail.

The safety link assembly 140 comprises a main body 150, upon which is mounted a retaining mechanism 160 and a securing mechanism 170.

The main body 150 is generally rectangular with a flat abutment surface 152 upon which an ejectable lug 180 rests. Hanging over that flat surface is a shaped curved lip 154. The lip 154 is designed to aid in retaining the ejectable lug 180 against the flat abutment surface 152. The ejectable lug 180 is connected by a pin 181 to a further lug/pin set 182. This set 182 connects to the strop line 108.

Hence, the releasable connection 107 described in general terms above corresponds to the retention/ejection of the ejectable lug 180 with respect to the main body 150.

There is also a spring (not shown) on the flat surface 152 which acts to bias the lug 180, placed against the surface 152, away from the main body 150.

The retaining mechanism 160 comprises a base portion 161 with two holes 162*a* and 162*b* at opposite sides. A pin 163 extends through both holes 162*a*, 162*b* of the base portion 161 and is attached at one end of the main body 150. Hence, the retaining mechanism 160 is pivotally mounted at pin 163 to the main body 150. Extending from the base portion are two retaining arms 164, 165, extending along the main body 150; one on each side. These arms 164, 165 act to hold the ejectable lug 180, on either side, against the abutment surface 152 of the main body 150. Numeral 168 represents the general region on the arms 164, 165 where they act on the lug 180 to retain it. At the ends of each arm (the region represented generally by numeral 169) 164, 165 are shaped divots 166, 167.

The securing mechanism 170, which can be seen most clearly in FIGS. 4*a* to 4*d*, comprises a pair of levers 170 pivotally mounted by pin 171 towards the opposite end of the main body 150. The levers 170 each have a short first arm 173 with a roller 175 at their end region. They also have a longer second arm 174 extending in approximately the opposite direction from the pivot point 171 to the first arm 173. The second arms 174 also have a roller 176 at their end region.

Each roller 175 of the first arms 173 is sized so as to fit in the corresponding divot 166 or 167 of the arms 164 or 165 of the retaining mechanism 160. Hence, when the securing levers 170 are in the position shown in FIG. 4*a*, the rollers 175 act to hold the retaining mechanism 160 in place so as to retain the lug 180 against the main body 150.

Attached to the back of the main body 150 is a mounting assembly 110 comprising a mounting body 111. The mounting body 111 comprises a pivot mount 112 for a drop arm assembly 130, which will now be described.

The drop arm assembly 130 comprises a drop arm 131, formed of a fixed sleeve portion 132 and an adjustable portion 133 which is slidable within the sleeve portion 131 to adjust the height of the drop arm 131. The two portions 132, 133 of the drop arm 131 are held in place with a biased pin 134 designed to latch in any of a number of adjustable height holes 135. There is a wheel 136 at the lower end of the drop arm 131 to aid its running along an aircraft floor.

The sleeve portion 132 is mounted on a mounting arm 137. The mounting arm 137 is pivotally mounted on the pivot mount 112 of the mounting body 111.

Figure 2A:
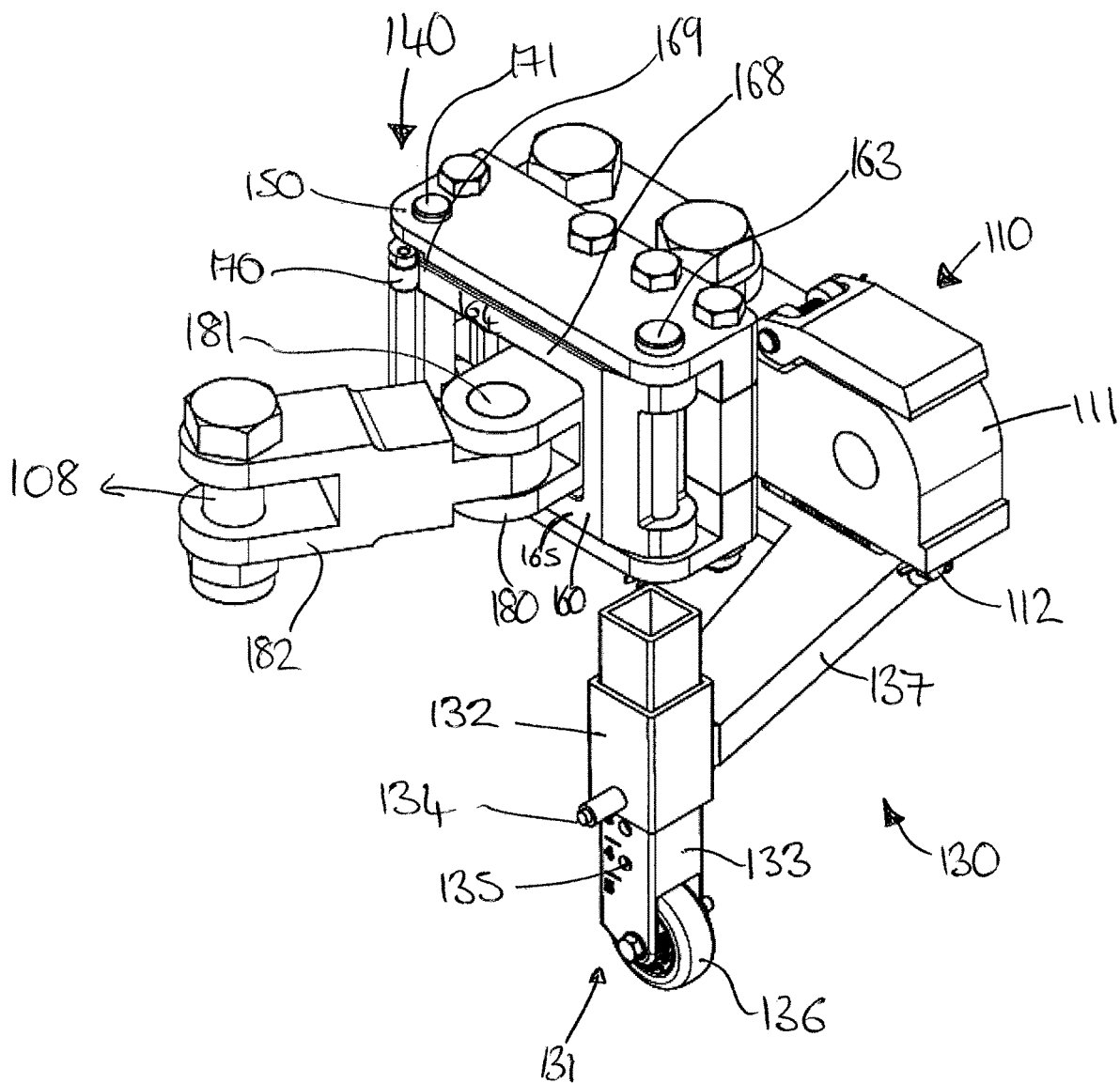
FIG. 2a shows a part of the aerial delivery system of FIGS. 1a and 1b in a resting configuration.
Figure 2B:
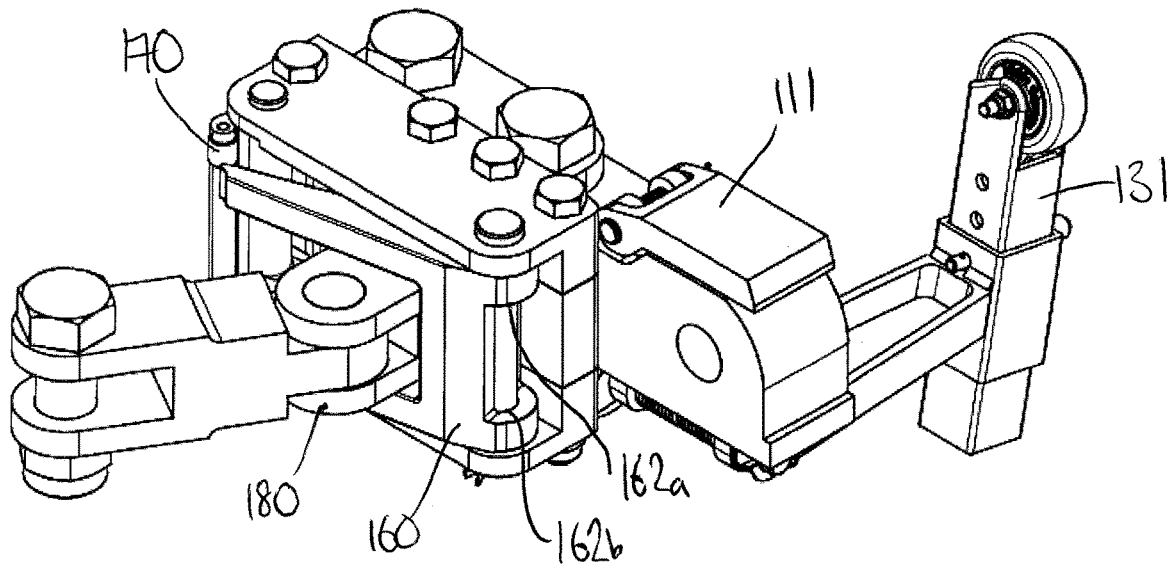
FIG. 2b shows the part of the aerial delivery system of FIG. 2a in a first stage of normal operation.
Figure 2C:
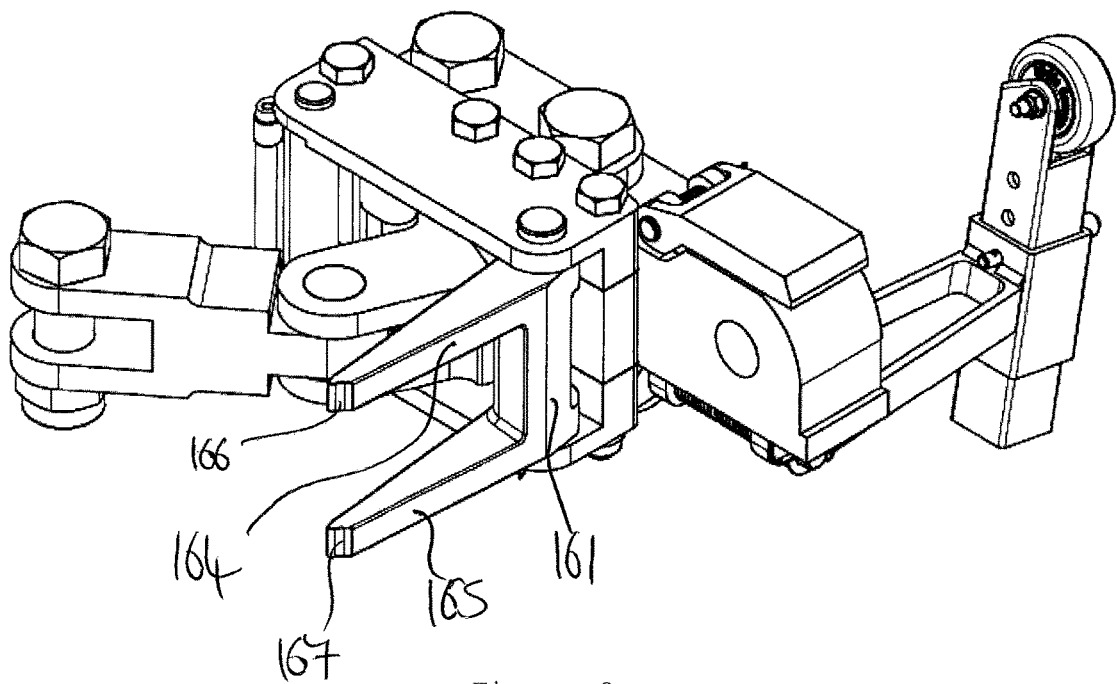
FIG. 2c shows the part of the aerial delivery system in a second stage of normal operation.
Figure 2D:
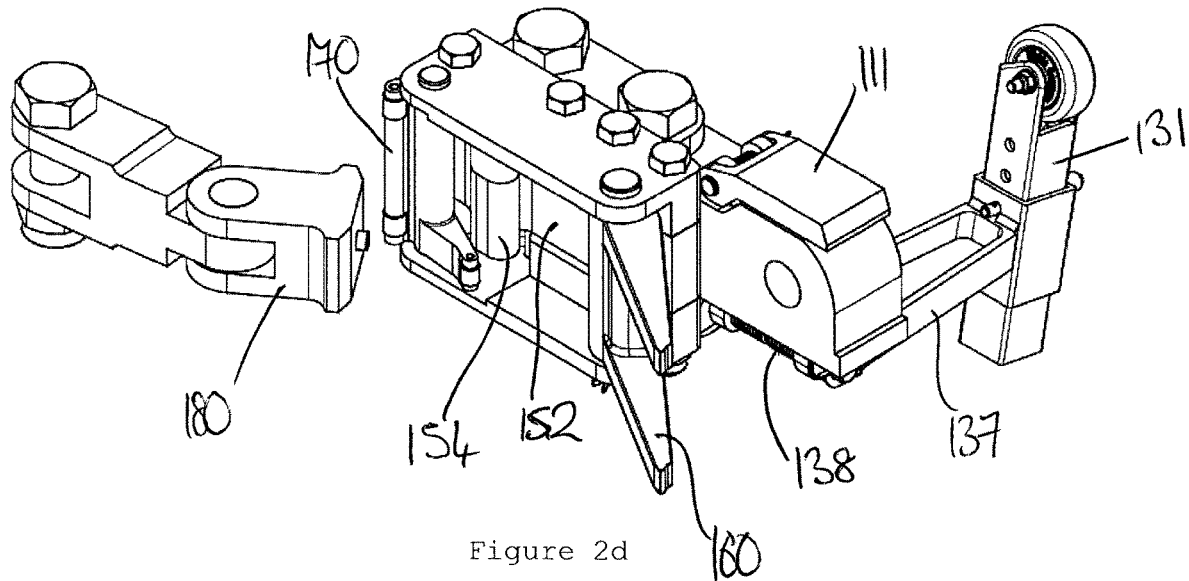
FIG. 2d shows the part of the aerial delivery system in a third stage of normal operation.

Hence, the drop arm 131 can pivot from a first position shown in FIG. 2*a* to a second position shown in FIGS. 2*b*, *c* and *d*. It is noted that the drop arm 131 is in the position of FIG. 2*a* when it is resting on the aircraft floor—i.e. when the drop arm 131 is located within the aircraft. It pivots to the second position when the aircraft floor "disappears"—i.e. when the drop arm 131 is outside the aircraft. It is noted that the pivot mount 112 is sprung with spring 138 to bias the drop arm 131 into the position shown in FIGS. 2*b*, *c* and *d*.

The safety link assembly 140 also comprises a cam follower assembly 120, as shown in FIGS. 4*a* to 4*d*. The cam follower assembly comprises a shaped cam follower member 121 with a rod portion 122 at one end and a rounded cam follower surface 125 at the other. In the middle is an oval hole 124. A pin 115 attached to the mounting body 111 extends through the hole 124 to allow the cam follower member 121 to slide back and forth. The main body 150 also comprises a cam abutment roller 157.

Figure 4A:
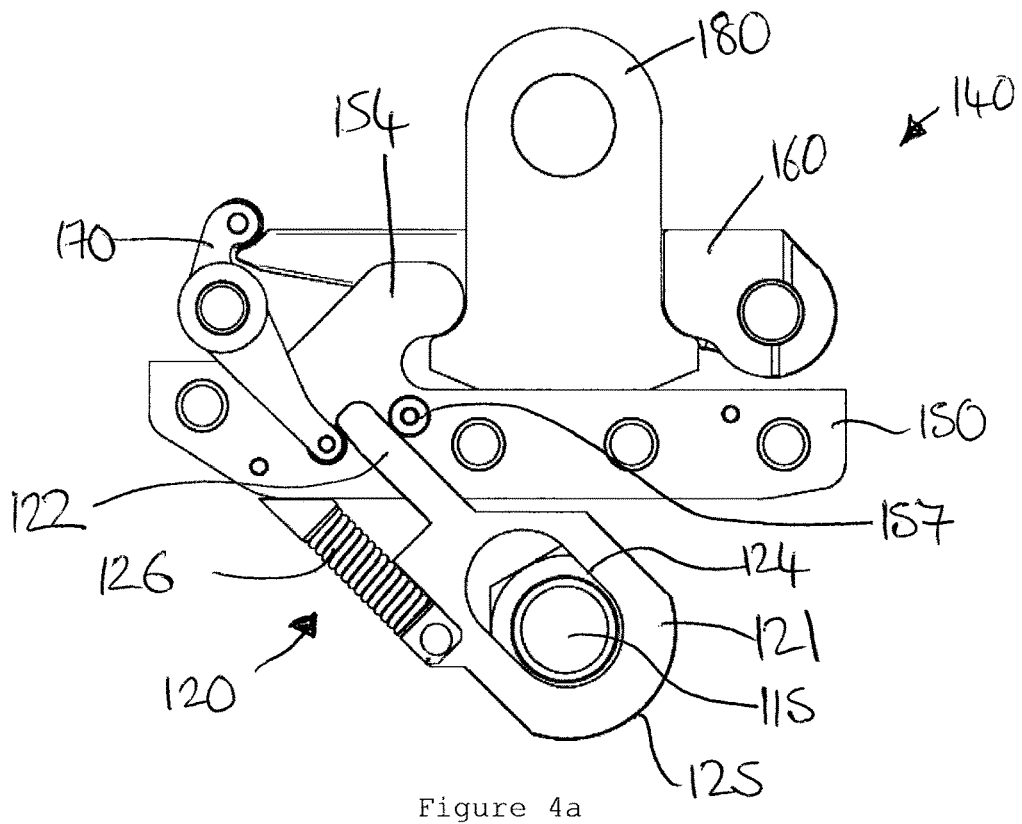
FIG. 4a shows an enlargement of the safety link assembly of earlier figures, shown in a resting configuration.

When in a locking position, shown in FIG. 4*a*, the rod 122 is located between the cam abutment roller 157 and the roller 176 on the second arm 174 of the securing levers 170. Hence, the securing levers 170 are prevented from rotating anti-clockwise and so kept in their securing position against the retaining arms 164, 165.

The cam follower member 121 is biased away from that locking position by a spring 126.

Figure 5:
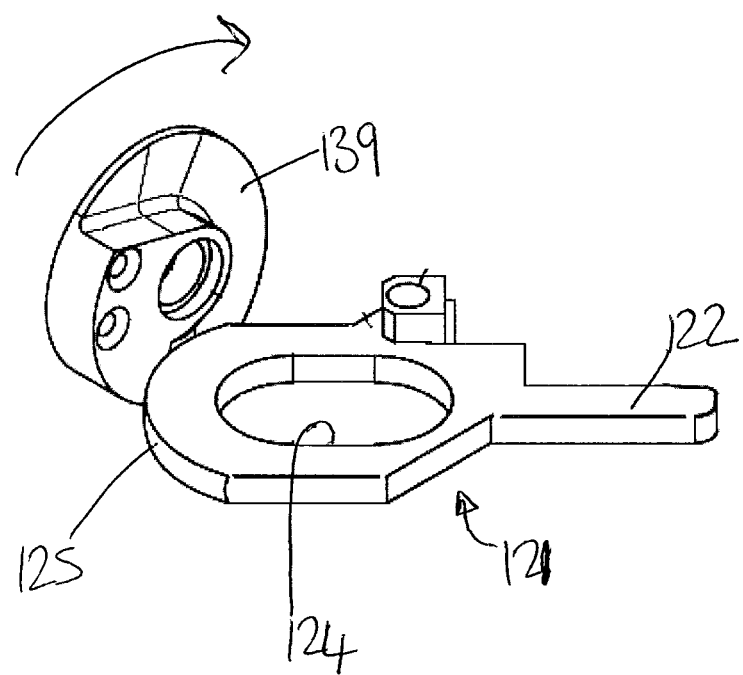
FIG. 5 shows an enlargement showing the cam and cam follower surfaces of the safety link assembly.

The rounded cam follower surface 125 abuts against a spiral cam surface 139, as shown in FIG. 5. The spiral cam surface 139 is part of a disc that is pivotally mounted to the mounting body 111 such that it rotates in the direction shown in FIG. 5 when the drop arm 131 rotates from the position in FIG. 2*a* to the position of FIGS. 2*b*, *c* and *d*. As the surface 139 is spiralled, the "height" of the cam surface 139 in relation to the cam follower surface 125 reduces as it rotates, effectively allowing the cam follower member 121 to move away from the main body 150 under the bias of spring 126.

Figure 4B:
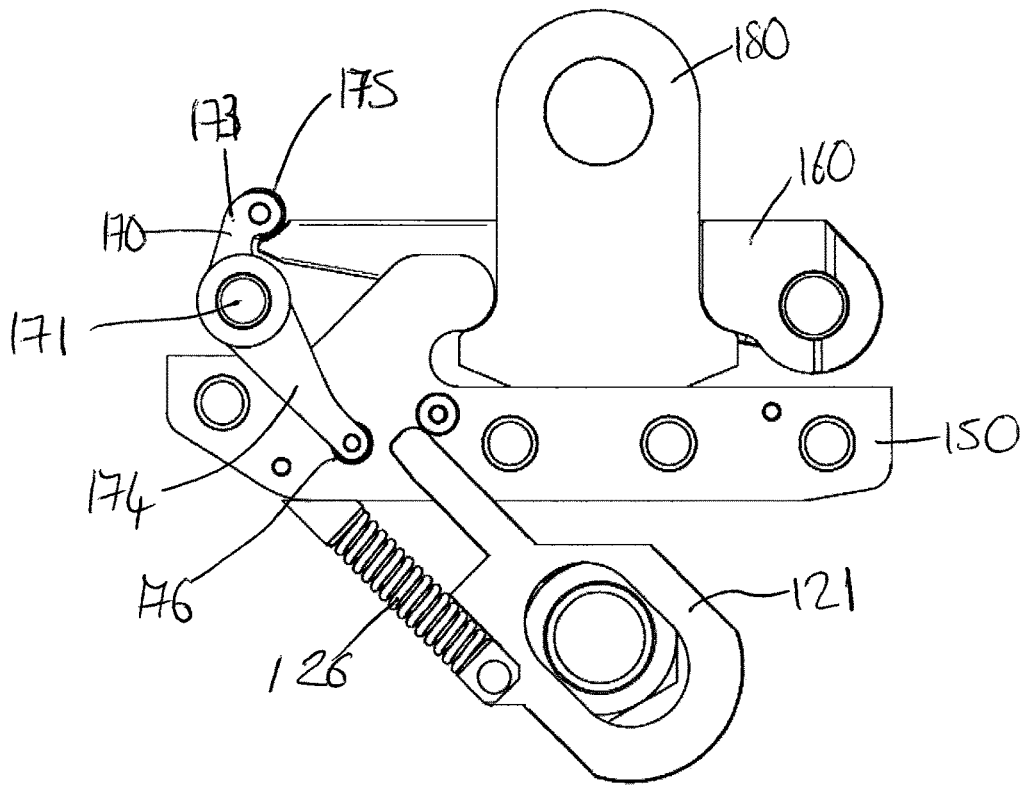
FIG. 4b shows the safety link assembly in an intermediate stage of normal operation.

This causes the cam follower member 121 to move to the position of FIG. 4*b*. Here, it is no longer preventing the securing levers 170 from rotating anti-clockwise.

Figure 4C:
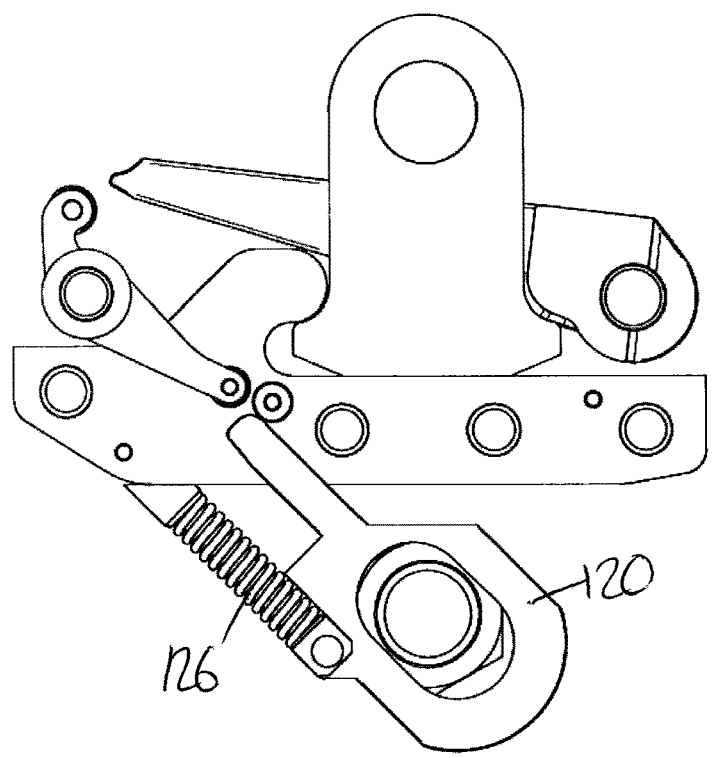
FIG. 4c shows the safety link assembly in a first stage of normal operation.
Figure 4D:
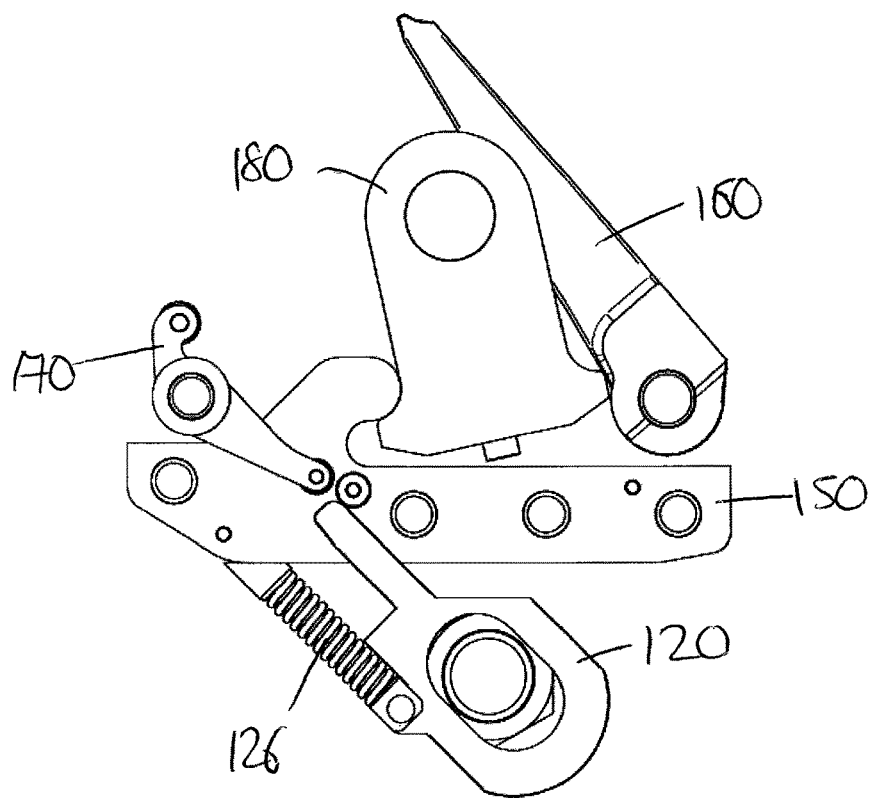
FIG. 4d shows the safety link assembly in a second stage of normal operation.

Hence, once this occurs, the securing levers 170 can rotate anti-clockwise (FIG. 4*c*). This causes the retaining arms 164, 165 to be released (by rotating clockwise) to a releasing position (FIG. 4*c*). When lug 180 is then pulled by tension in the strop line 108, it is pulled out from under the retaining arms 164, 165 and the connection 107 is released.

Normal operation of the system 100 will now be described:

During normal operation (i.e. aerial delivery of the platform 101 from an aircraft), when the extractor parachute 104 is open, it drags the system 100 towards the back of the aircraft. In particular, the platform 101 runs on rails inside the aircraft. When the platform 101 reaches a desired position (generally when it is approaching or past the back of the aircraft), the releasable jaw connection 109 is released. This causes tension in the strop line 108.

At the same, or similar, time the drop arm 131 leaves the aircraft and pivots to the position shown in FIG. 2b. This causes the spiral cam surface 139 to rotate. This causes the cam follower member 121 to move away from the main body 150, and to release the securing levers 170. This, in turn releases the retaining arms 164, 165 and so ejectable lug 180 (being pulled by the strop line 108) is pulled out and away from the main body 150, thereby releasing connection 107.

This means that both parallel connection paths have been broken and so the extractor parachute 104 can be effectively separated from the platform 101.

Figure 3:
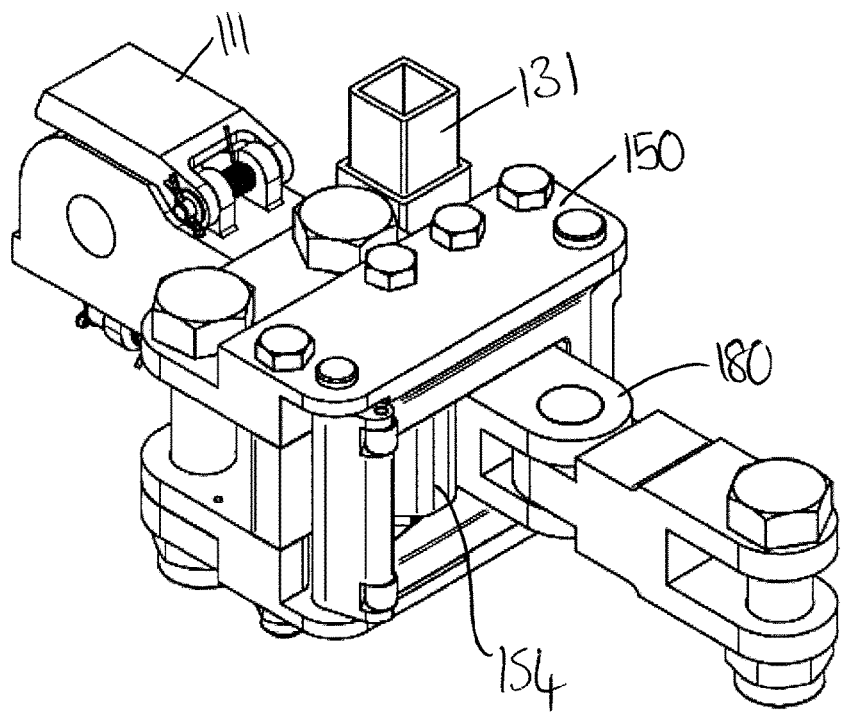
FIG. 3 shows the part of the aerial delivery system during failsafe operation.

Failsafe operation of the system 100 will now be described:

Failsafe operation occurs when the releasable jaw connection 109 is released too early. This causes separation of the EPJD 103 and the EFT coupling 102. This causes the strop line 108 to become taught and for the safety link assembly 140 to be pivoted round so that the releasable connection 107 is in line with the taught strop line 108, as shown in FIGS. 1b and 3. The releasable connection 107 keeps the extractor parachute 104 and platform 101 connected until the correct time.

The correct time is determined by when the drop arm 131 leaves the aircraft and pivots to a similar position as that shown in FIG. 2b. This causes the spiral cam surface 139 to rotate. This causes the cam follower member 121 to move away from the main body 150, and to release the securing levers 170. This, in turn releases the retaining arms 164, 165 and so ejectable lug 180 (being pulled by the strop line 108) is pulled out and away from the main body, thereby releasing connection 107.

This, again, means that both parallel connection paths have been broken and so the extractor parachute 104 can be effectively separated from the platform 101.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A safety link assembly, the assembly comprising:
 a main body,
 an ejectable connector,
 a retaining mechanism comprising a retaining lever rotatably mounted on a rotary axis on the main body and rotatable between a first retaining position, in which a first region of the retaining lever acts on the ejectable connector to retain the ejectable connector adjacent the main body, and a second releasing position, in which the ejectable connector is ejectable from the main body, and
 a securing mechanism comprising a securing member moveable between a first securing position, in which a first region of the securing member acts on a second region of the retaining lever to secure the retaining lever in its first retaining position, and a second non-securing position, in which the retaining lever is not secured in the first retaining position,
 wherein the distance from the first region of the retaining lever to the rotary axis is less than the distance from the second region of the retaining lever to the rotary axis,
 wherein the first region and second region of the retaining lever are both on the same side of the retaining lever with respect to the rotary axis,
 wherein the safety link assembly is configured to connect an aerial delivery platform to an extractor parachute for extracting the aerial delivery platform from an aircraft, the safety link assembly is configured to release the connection between the aerial delivery platform and the extractor parachute once the aerial delivery platform has been sufficiently extracted from the aircraft, and
 wherein the retaining mechanism is configured to release the ejectable connector whilst the ejectable connector is under tension as a result of being retained by the retaining mechanism and being pulled in a direction away from the retaining mechanism.

2. The safety link assembly claim 1, wherein the securing member comprises a securing lever rotatably mounted on a rotary axis on the main body and rotatable between the first securing position and second non-securing position.

3. The safety link assembly of claim 2, wherein the securing mechanism further comprises a locking member, moveable between a first locking position, in which the locking member acts on a second region of the securing lever to lock the securing lever in its first securing position, and a second non-locking position, in which the securing lever is not locked in the first securing position.

4. The safety link assembly of claim 3, wherein the distance from the first region of the securing lever to the rotary axis of the securing lever is less than the distance from the second region of the securing lever to the rotary axis.

5. The safety link assembly of claim 3, wherein the first region and second region of the securing lever are on opposite sides of the securing lever with respect to the rotary axis.

6. The safety link assembly of claim 3, wherein the locking member is biased towards its second non-locking position by a biasing member.

7. The safety link assembly of claim 3, wherein the locking member comprises a cam follower surface and wherein the assembly further comprises a cam with a corresponding cam surface.

8. The safety link assembly of claim 7, wherein the cam is associated with a drop arm such that when the drop arm moves, the cam also moves and enables movement of the locking member.

9. The safety link assembly of claim 8, wherein, when the drop arm moves it causes the cam to rotate.

10. The safety link assembly of claim 9, wherein the cam surface is at least partially shaped as a spiral so that as the cam rotates in an unlocking direction, the cam surface upon which the cam follower surface of the locking member abuts moves in a direction away from the locking member, allowing the locking member to move from its first locking position to its second un-locking position.

11. The safety link assembly of claim 7, wherein the cam follower surface is a convex rounded shape.

12. The safety link assembly of claim 1, wherein the retaining lever is rotatable from its first retaining position, past its second releasing position to a third fully released position, in which the retaining lever is out of an ejection path of the ejectable connector.

13. The safety link assembly of claim 1, wherein the main body comprises a biasing member to bias the retaining lever away from its first retaining position.

14. The safety link assembly as claimed in claim 13, wherein the biasing member is positioned adjacent the ejectable connector in use such that the ejectable connector is biased away from the body and biases the retaining lever away from the first retaining position.

15. The safety link assembly of claim 1, wherein the main body also comprises a retaining lip to help retain the ejectable connector adjacent to the main body.

16. The safety link assembly of claim 15, wherein the retaining lip is curved in shape.

17. The safety link assembly of claim 16, wherein the ejectable connector comprises a shaped portion that corresponds to the shape of the retaining lip.

18. An aerial delivery apparatus, comprising:
an aerial delivery platform;
an extractor parachute configured to extract the aerial delivery platform from an aircraft; and
a safety link assembly, wherein
the safety link assembly comprises:
a main body,
an ejectable connector,
a retaining mechanism comprising a retaining lever rotatably mounted on a rotary axis on the main body and rotatable between a first retaining position, in which a first region of the retaining lever acts on the ejectable connector to retain the ejectable connector adjacent the main body, and a second releasing position, in which the ejectable connector is ejectable from the main body, and
a securing mechanism comprising a securing member moveable between a first securing position, in which a first region of the securing member acts on a second region of the retaining lever to secure the retaining lever in its first retaining position, and a second non-securing position, in which the retaining lever is not secured in the first retaining position,
wherein a distance from the first region of the retaining lever to the rotary axis is less than a distance from the second region of the retaining lever to the rotary axis,
wherein the first region and second region of the retaining lever are both on the same side of the retaining lever with respect to the rotary axis,
wherein the safety link assembly connects the aerial delivery platform to the extractor parachute via the ejectable connector, the safety link assembly being configured to release the connection between the aerial delivery platform and the extractor parachute once the aerial delivery platform has been sufficiently extracted from the aircraft, and
wherein the retaining mechanism is configured to release the ejectable connector whilst the ejectable connector is under tension as a result of being retained by the retaining mechanism and being pulled in a direction away from the retaining mechanism.

19. The aerial delivery apparatus of claim 18, further comprising a main parachute, wherein the extractor parachute is arranged to deploy the main parachute when the connection between the extractor parachute and the aerial delivery platform is released.

20. A safety link assembly, comprising:
a main body,
an ejectable connector,
a retaining mechanism comprising a retaining lever rotatably mounted on a first rotary axis on the main body and rotatable between a first retaining position, in which a first region of the retaining lever acts on the ejectable connector to retain the ejectable connector adjacent the main body, and a second releasing position, in which the ejectable connector is ejectable from the main body,
a securing mechanism comprising a securing member moveable between a first securing position, in which a first region of the securing member acts on a second region of the retaining lever to secure the retaining lever in its first retaining position, and a second non-securing position, in which the retaining lever is not secured in the first retaining position,
wherein the distance from the first region of the retaining lever to the first rotary axis is less than the distance from the second region of the retaining lever to the first rotary axis,
wherein the assembly further comprises a drop arm arranged to rest on an aircraft floor and to move when the drop arm loses contact with the aircraft floor during an extraction of the aerial delivery platform from the aircraft,
wherein movement of the drop arm causes the securing mechanism to move to the second non-securing position, and
the safety link assembly is configured to connect an aerial delivery platform to an extractor parachute for extracting the aerial delivery platform from an aircraft, the safety link assembly being configured to release the connection between the aerial delivery platform and the extractor parachute once the aerial delivery platform has been sufficiently extracted from the aircraft.

* * * * *